United States Patent [19]

Ondrejas et al.

[11] Patent Number: 4,855,182
[45] Date of Patent: Aug. 8, 1989

[54] REPAIR LAMINATE

[75] Inventors: Johann Ondrejas, Vienna; Friedrich Zitz, Friedberg, both of Austria

[73] Assignee: Isovolta Osterreichische Isolierstoffwerke Aktiengesellschaft, Wiener Neudorf, Austria

[21] Appl. No.: 103,889

[22] Filed: Oct. 2, 1987

[30] Foreign Application Priority Data

Oct. 3, 1986 [AT] Austria .................................. 2655/86

[51] Int. Cl.⁴ ................................................ C09U 7/02
[52] U.S. Cl. ..................................... 428/343; 418/354; 418/355; 418/420; 418/421
[58] Field of Search ............... 418/343, 346, 354, 355, 418/420, 421, 273, 417

[56] References Cited

U.S. PATENT DOCUMENTS

| | | | |
|---|---|---|---|
| 4,304,813 | 12/1981 | Elmore | 428/354 |
| 4,379,806 | 4/1983 | Horpman | 428/354 |
| 4,511,621 | 4/1985 | Thomas et al. | 428/354 |
| 4,528,230 | 7/1985 | Larson | 428/354 |
| 4,677,017 | 6/1987 | De Antonis et al. | 428/354 |

Primary Examiner—James J. Bell
Attorney, Agent, or Firm—Bierman and Muserlian

[57] ABSTRACT

A repair laminate for the quick repair of lightweight panels used particularly in aircraft construction comprised of a lightweight core 2, e.g., in the form of a possibly pressed honeycomb structure, and two outer laminates 3, 4, which repair laminate is comprised of a solid cured or thermoplastic layer of synthetic material 13 bonded on one side to a hot-melt adhesive 15 and optionally on the other side to a decorative liner-layer. The synthetic material layer 13 may advantageously be a glass-fabric reinforced phenol aldehyde resin and the liner-laminate may be a dyed polyvinyl fluoride film.

For the repair, an area 6 of the damaged lining laminates 3, 4, and the core material below them is removed from the damaged section 5, and replacement core material is inserted into the space of the removed core areas and optionally the removed lining laminate areas; the panel surface at the damaged lining laminates 3, 4, is ground off and repair laminate blanks 11 are glued over the areas of the damaged spots by being ironed onto the ground panel surface, whereby the blanks 11 laterally overlap the remote lining laminate areas 6.

6 Claims, 1 Drawing Sheet

REPAIR LAMINATE

STATE OF THE ART

Walls and partitions in the cargo spaces of large aircraft are commonly formed of lightweight panels and/or are lined with such panels, which are known internationally as "cargo panels." Lightweight panels of this kind are usually comprised of a lightweight core of an honeycomb structure, which at least on one face side is joined to a lining laminate. Occasionally, particularly during loading and unloading of the cargo, these panels suffer mechanical damage by which usually the lining laminate and the lightweight core are dented and/or the panel may be punctured.

To repair such damage, the lining laminate and, if necessary, the lightweight core in the damaged area are partially stripped or removed and the removed parts of the lightweight core are optionally replaced. A glass fiber fabric impregnated with an epoxy resin-hardener mixture is now laminated on the prepared area in at least one layer, one above the other. The repair of the panels can then be made on the disassembled pane during an overhaul of the aircraft, with the curing of the epoxy resin layers that were laminated on preferably being effected at higher temperatures in a furnace. Laminating of the epoxy resin layers to a panel that has not been dismantled and is still in place can now be effected at only slightly elevated temperature, which requires relatively long curing times that are too long, e.g., for repair during the simple aircraft maintenance.

OBJECTS OF THE INVENTION

It is an object of the invention to provide a novel repair laminate which can be used to quickly and simply repair mechanical damage to lightweight panels without removal of the same and without toxic emissions.

It is another object of the invention to provide a novel method of repairing mechanically damaged lightweight panels.

These and other objects and advantages of the invention will become obvious from the following detailed description.

THE INVENTION

The novel laminate of the invention for the repair of damaged lightweight panels is comprised of at least one solid, cured or thermoplastic layer of synthetic material (13) bonded on one side to a thermally activated adhesive layer (15) and optionally on the other to a decorative layer. Preferably, the layer of synthetic material contains a fiber reinforcement such as fibrous tissue.

In an advantageous embodiment of the repair laminate of the invention the cured layer of synthetic material is a duromer synthetic resin which is at least mostly comprised of alphenol aldehyde resin. In another advantageous embodiment of the repair laminate of the invention, the adhesive layer is a hot-melt adhesive.

The novel method of the invention of repairing lightweight panels comprising a lightweight core (2) with at least one lining laminate (3,4) at one panel surface (7) comprises removing from the damaged section (5) the laminate (3,4) and optionally at least a portion of the lightweight core (2), placing a blank of a repair laminate of the invention over the area of the damaged section (5) to laterally overlap the laminate area adjacent the damaged section (5) and pressing the same and heating the said blank to melt the adhesive layer (15) to bond the blank to the lightweight panel.

In an advantageous embodiment of the invention, a replacement core material is inserted into and/or glued in the space of the removed lightweight core area and if necessary of the removed lining laminate areas. According to another advantageous embodiment of the invention, a piece of the original core material is inserted and/or glued in the space of the removed lightweight core area and, if necessary, of the removed lining laminate areas.

Referring now to the drawings.

Figure 1:
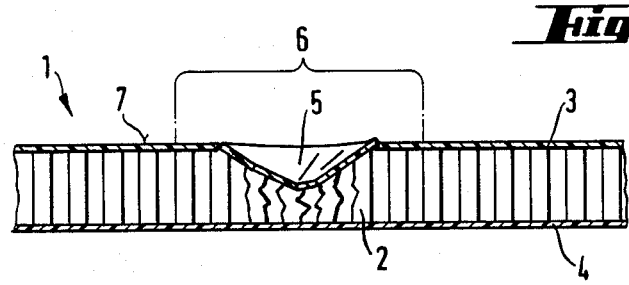
FIG. 1 is a cross-sectional view of a damaged cargo lightweight panel.

In FIG. 1, "cargo panel" 1 which is used in aircraft construction and has a total thickness of approximately 7 mm is comprised of a honeycomb structure made of a polyamide fiber paper which is known, e.g., under the trade name "Nomex." On the two outer surfaces of the honeycomb core 2, lining laminates 3 and 4 have been laminated in thickness of about 0.2 mm which lining laminates each have at the core side a thin layer of glass fabric impregnated with phenol formaldehyde resin which at the panel surface is onded to a white-dyed polyvinylfluoride film (e.g., available under the trade name "Tedlar"). Instead of the described honeycomb core 2, the core may also consist of a pressed honeycomb structure as known in aircraft panels.

The panel 1 has been damaged, e.g., by a corner of a piece of cargo hitting the section marked 5 in FIG. 1 and the repair of this damaged section 5 is effected in the following manner. Above an area marked 6 which at the panel's front side 7 displays, for example, the form of a square with rounded edges and which comprises the damaged section 5, the lining laminate 3 and the core material below it are stripped away, e.g., by cutting.

The further steps of the process are described below with the aid of FIG. 2 which shows the panel 1 on a scale that is enlarged in relation to FIG. 1. Into the space above area 6 from which the lining laminate 3 and the core material, respectively, have been removed, a replacement core material 9 which may consist of a curing synthetic adhesive is at first inserted. Then, the panel front side 7 is ground over an area 8 that laterally overlaps the area 6 so that the polyvinyl fluoride liner-film of the lining laminate 3 is removed there and a roughened surface 10 will remain at the replacement core material 9 and the lining laminate 3.

To replace the stripped off lining laminate 3, a repair laminate is used that is in the form of a synthetic material layer reinforced by two layers of glass fabric produced by impregnating the glass fabric layers with a phenol formaldehyde resin of the resol type with a glass content of 100 g/m$^2$ and a phenol resin content of 100 g/m$^2$ (solid material) and subsequent curing. A layer of a hot-melt polyester based adhesive is applied to one side of the synthetic material layer with an application quantity of about 125 g/m$^2$, while the other side of the synthetic material layer is bonded to a liner-film, e.g., about 0.025 mm thick consisting of polyvinyl fluoride that is colored white, for example. A blank 11 (FIG. 2) of a repair laminate, in the form of a square with rounded corners is then pressed with the hot-melt adhesive layer against the rough-ground surface 10 of the panel surface 7 through use of a pressing iron-type tool, and thereby heated to a temperature of about 105° C. at which the hot-melt adhesive becomes activated and enters into a good bond with the rough-ground surface 10.

Figure 2:
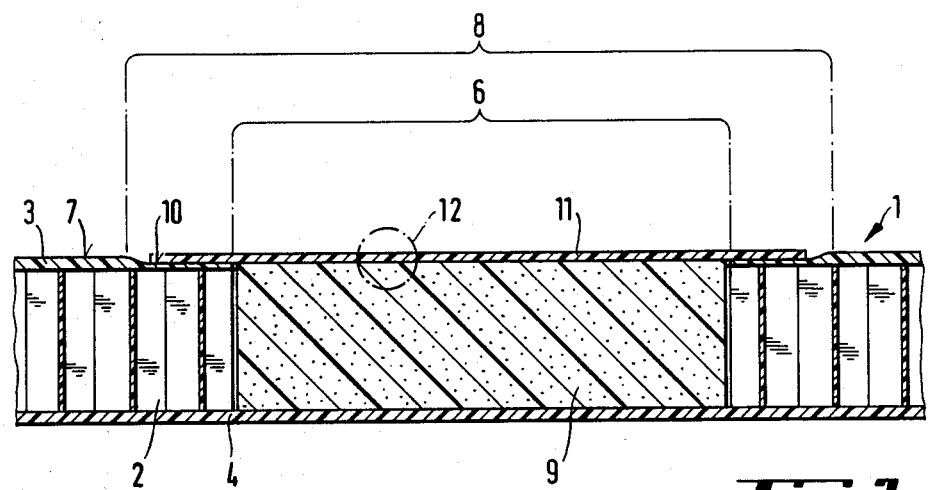
FIG. 2 is a cross-sectional view of the repaired panel.
Figure 3:
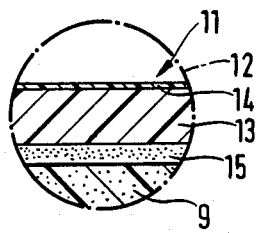
FIG. 3 is a partial cross-section of a repair laminate of the invention.

FIG. 3 shows in the circle 12 of FIG. 2 the structure of the repair laminate with the synthetic material layer 13 reinforced with glass fabric, the liner-film 14, as well as the hot-melt adhesive layer 15.

If the damage to the panel is such that not only the lining laminate and the core are dented, the panel 1 is punctured through its entire thickness, one proceeds so that a window-shaped break-out is cut out of the panel at the damaged spot. Then, the panel is ground at the surface of one of the lining laminates (e.g., the lining laminate 4) over the area 8 and then, similarly as described in FIG. 2, a first repair laminate blank 11 is applied to it by "ironing." Next, the insertion of the replacement core material 9, the grinding of the panel surface 7 and application of a repair laminate blank (the second one) to the panel surface 7 exactly as described with FIG. 2, are carried through in sequence.

In a variation of the above described repair process, the space of the removed lightweight core portion respectively the possibly removed lining laminate areas may also be replaced advantageously by applying instead of a replacement core material 9, a piece of a properly cut original core material that is glued into the created cavity.

Various modifications of the article and method of the invention may be made without departing from the spirit or scope thereof and it is to be understood that the invention is intended to be limited only as defined in the appended claims.

What we claim is:

1. A repair laminate for the repair of lightweight panels consisting essentially of at least one solid, cured or thermoplastic layer of synthetic material (13) containing a duromer synthetic resin and a fiber reinforcement bonded on one side to the thermally activated adhesive layer (15) and optionally on the other to decorative layer.

2. A repair laminate of claim 1 wherein the fiber reinforcement is a fiber fabric.

3. A repair laminate of claim 1 is where there is a decorative lining layer.

4. A repair laminate of claim 3 wherein the decorative layer contains a film (14) preponderately consisting of polyvinyl fluoride.

5. A repair laminate of claim 1 wherein the duromer synthetic is comprised of at least mainly of a phenolic aldehyde resin.

6. A repair laminate of claim 1 wherein the adhesive layer (15) contains a hot-melt adhesive.

* * * * *